(12) United States Patent
Rashidi et al.

(10) Patent No.: US 12,539,122 B2
(45) Date of Patent: Feb. 3, 2026

(54) DEVICES, SYSTEMS, AND METHODS FOR TREATING ANEURYSMS

(71) Applicant: Covidien LP, Mansfield, MA (US)

(72) Inventors: Mehdi Matteo Rashidi, Irvine, CA (US); Junwei Li, Irvine, CA (US); Belinko K. Matsuura, Encinitas, CA (US); David G. Matsuura, Solana Beach, CA (US); Nelson M. Siu, Encinatas, CA (US)

(73) Assignee: Covidien LP, Mansfield, MA (US)

( * ) Notice: Subject to any disclaimer, the term of this patent is extended or adjusted under 35 U.S.C. 154(b) by 508 days.

(21) Appl. No.: 17/816,380

(22) Filed: Jul. 29, 2022

(65) Prior Publication Data

US 2024/0032932 A1    Feb. 1, 2024

(51) Int. Cl.
*A61B 17/12* (2006.01)

(52) U.S. Cl.
CPC .. *A61B 17/12113* (2013.01); *A61B 17/12027* (2013.01); *A61B 2017/1205* (2013.01)

(58) Field of Classification Search
CPC ........ A61B 17/12022; A61B 17/12027; A61B 17/12031; A61B 17/12113; A61B 17/1214; A61B 17/12145; A61B 17/12168; A61B 17/12172; A61B 17/12177; A61B 2017/12054
See application file for complete search history.

(56) References Cited

U.S. PATENT DOCUMENTS

| | | | | |
|---|---|---|---|---|
| 5,749,894 A | * | 5/1998 | Engelson | A61B 17/12145 606/191 |
| 5,800,455 A | * | 9/1998 | Palermo | A61B 17/12022 606/198 |

(Continued)

FOREIGN PATENT DOCUMENTS

| | | |
|---|---|---|
| EP | 2265193 B1 | 11/2011 |
| EP | 3403597 A1 | 11/2018 |

(Continued)

OTHER PUBLICATIONS

International Search Report and Written Opinion mailed Feb. 1, 2024, International Application No. PCT/US2023/071026, 12 pages.

(Continued)

*Primary Examiner* — Kathleen S Holwerda
(74) *Attorney, Agent, or Firm* — Fortem IP LLP

(57) ABSTRACT

Devices, systems, and methods for treating aneurysms are disclosed herein. According to some embodiments, the present technology includes a treatment system comprising a delivery shaft, a manipulation shaft slidably positioned within the lumen of the delivery shaft, and an occlusive device configured for implantation within the aneurysm. The occlusive device can comprise a plurality of filaments that are secured to one another at a proximal end of the occlusive device by a cured material. The occlusive device can comprise inner and outer layers of braided filaments, wherein the proximal end region of the inner layer has an exposed portion that extends proximally beyond the proximal end region of the outer layer, and wherein the cured material (Continued)

extends into and fills interstices between the braided filaments at the proximal end regions of the inner and outer layers.

16 Claims, 9 Drawing Sheets

(56) References Cited

U.S. PATENT DOCUMENTS

| | | | |
|---|---|---|---|
| 6,280,423 | B1 | 8/2001 | Davey et al. |
| 10,398,441 | B2 | 9/2019 | Warner et al. |
| 11,583,288 | B2 | 2/2023 | Gorochow |
| 11,678,888 | B2 | 6/2023 | Shimizu et al. |
| 11,826,863 | B2 | 11/2023 | Li et al. |
| 12,070,221 | B2 | 8/2024 | Rashidi et al. |
| 12,251,110 | B2 | 3/2025 | Nguyen et al. |
| 2003/0097149 | A1 | 5/2003 | Edwards et al. |
| 2003/0171739 | A1 | 9/2003 | Murphy et al. |
| 2004/0097988 | A1* | 5/2004 | Gittings ............... A61F 2/91 606/153 |
| 2006/0009799 | A1 | 1/2006 | Kleshinski et al. |
| 2006/0116711 | A1 | 6/2006 | Elliott et al. |
| 2006/0247572 | A1 | 11/2006 | McCartney |
| 2007/0265656 | A1 | 11/2007 | Amplatz et al. |
| 2012/0071964 | A1 | 3/2012 | Cattaneo et al. |
| 2013/0211492 | A1 | 8/2013 | Schneider et al. |
| 2013/0261656 | A1 | 10/2013 | Lorenzo |
| 2013/0261657 | A1 | 10/2013 | Lorenzo |
| 2015/0313605 | A1 | 11/2015 | Griffin |
| 2016/0008003 | A1* | 1/2016 | Kleshinski ....... A61B 17/12172 606/200 |
| 2016/0128699 | A1* | 5/2016 | Hadley ................ A61F 2/0108 606/200 |
| 2016/0206452 | A1 | 7/2016 | Berez et al. |
| 2016/0249934 | A1 | 9/2016 | Hewitt et al. |
| 2017/0224350 | A1 | 8/2017 | Shimizu et al. |
| 2017/0367707 | A1 | 12/2017 | Divino |
| 2019/0223881 | A1 | 7/2019 | Hewitt et al. |
| 2020/0054344 | A1 | 2/2020 | Connor |
| 2020/0367902 | A1 | 11/2020 | Cibulski et al. |
| 2021/0128160 | A1 | 5/2021 | Li et al. |
| 2021/0128165 | A1 | 5/2021 | Pulugurtha et al. |
| 2021/0128168 | A1* | 5/2021 | Nguyen ........... A61B 17/12186 |
| 2021/0128169 | A1 | 5/2021 | Li et al. |
| 2024/0032933 | A1 | 2/2024 | Rashidi et al. |
| 2024/0390010 | A1 | 11/2024 | Rashidi et al. |

FOREIGN PATENT DOCUMENTS

| | | |
|---|---|---|
| WO | 2009132045 A2 | 10/2009 |
| WO | 2015171268 A2 | 11/2015 |
| WO | 2017106265 A1 | 6/2017 |
| WO | 2022149141 A1 | 7/2022 |
| WO | 2024026352 A1 | 2/2024 |

OTHER PUBLICATIONS

International Search Report and Written Opinion mailed Oct. 2, 2023, International Application No. PCT/IB2023/057193, 14 pages.

* cited by examiner

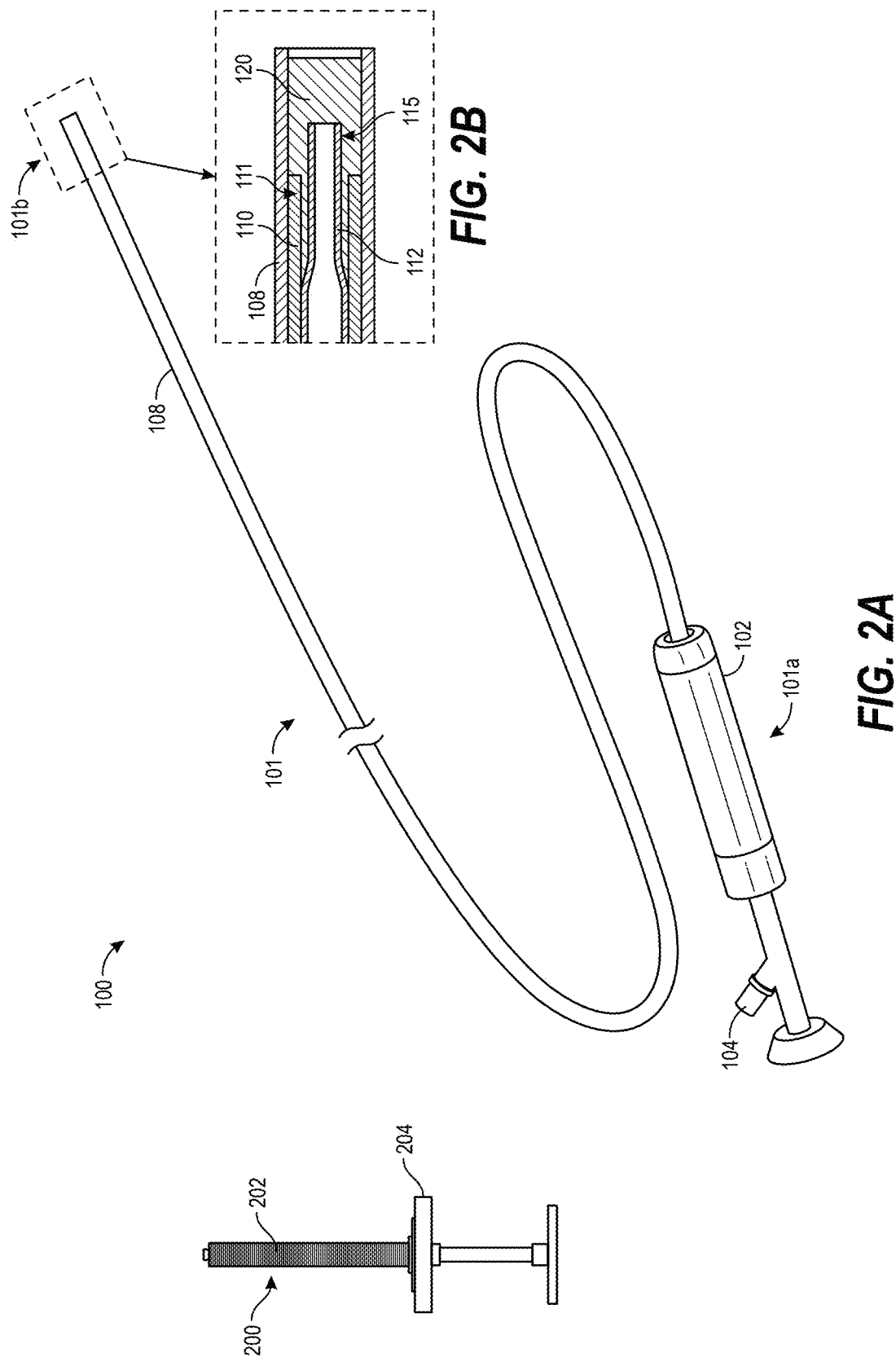

DEVICES, SYSTEMS, AND METHODS FOR TREATING ANEURYSMS

TECHNICAL FIELD

The present technology generally relates to medical devices, and in particular to implantable devices for treating vascular defects.

BACKGROUND

An intracranial aneurysm is a portion of an intracranial blood vessel that bulges outward from the blood vessel's main channel. This condition often occurs at a portion of a blood vessel that is abnormally weak because of a congenital anomaly, trauma, high blood pressure, or for another reason. Once an intracranial aneurysm forms, there is a significant risk that the aneurysm will eventually rupture and cause a medical emergency with a high risk of mortality due to hemorrhaging. When an unruptured intracranial aneurysm is detected or when a patient survives an initial rupture of an intracranial aneurysm, vascular surgery is often indicated. One conventional type of vascular surgery for treating an intracranial aneurysm includes using a microcatheter to dispose a platinum coil within an interior volume of the aneurysm. Over time, the presence of the coil should induce formation of a thrombus. Ideally, the aneurysm's neck closes at the site of the thrombus and is replaced with new endothelial tissue. Blood then bypasses the aneurysm, thereby reducing the risk of aneurysm rupture (or re-rupture) and associated hemorrhaging. Unfortunately, long-term recanalization (i.e., restoration of blood flow to the interior volume of the aneurysm) after this type of vascular surgery occurs in a number of cases, especially for intracranial aneurysms with relatively wide necks and/or relatively large interior volumes.

Another conventional type of vascular surgery for treating an intracranial aneurysm includes deploying a flow diverter within the associated intracranial blood vessel. The flow diverter is often a mesh tube that causes blood to preferentially flow along a main channel of the blood vessel while blood within the aneurysm stagnates. The stagnant blood within the aneurysm should eventually form a thrombus that leads to closure of the aneurysm's neck and to growth of new endothelial tissue, as with the platinum coil treatment. One significant drawback of flow diverters is that it may take weeks or months to form aneurysmal thrombus and significantly longer for the aneurysm neck to be covered with endothelial cells for full effect. This delay may be unacceptable when risk of aneurysm rupture (or re-rupture) is high. Moreover, flow diverters typically require antiplatelet therapy to prevent a thrombus from forming within the main channel of the blood vessel at the site of the flow diverter. Antiplatelet therapy may be contraindicated shortly after an initial aneurysm rupture has occurred because risk of re-rupture at this time is high and antiplatelet therapy tends to exacerbate intracranial hemorrhaging if re-rupture occurs. For these and other reasons, there is a need for innovation in the treatment of intracranial aneurysms.

SUMMARY

The present technology is directed to occlusive devices for treating aneurysms and associated systems and methods. Some embodiments include an occlusive device comprising a plurality of braided filaments that are secured to one another at a proximal end of the occlusive device via a cured material. In contrast to conventional securing means that utilize one or more metal bands placed around the filament ends, the cured material of the present technology extends into the gaps between the bundled filaments and holds them together without adding additional thickness to the braid. In some embodiments, one or more detachment features can be formed into the cured material that beneficially provide a low-profile connection mechanism between the occlusive device and the delivery system. The low-profile securing and detachment means enabled by the cured material can be especially beneficial for use in systems for treating cerebral aneurysms, as the small vessels of the neurovasculature can only be accessed by catheters having an extremely small diameter (e.g., microcatheters).

The subject technology is illustrated, for example, according to various aspects described below, including with reference to FIGS. 2A-8. Various examples of aspects of the subject technology are described as numbered clauses (1, 2, 3, etc.) for convenience. These are provided as examples and do not limit the subject technology.

1. A treatment system comprising:
   a delivery shaft having a proximal portion, a distal portion, and a lumen extending therethrough, wherein the distal portion is configured to be instravascularly positioned proximate an aneurysm;
   a manipulation shaft slidably positioned within the lumen of the delivery shaft, the manipulation shaft having a proximal portion and a distal portion; and
   an occlusive device configured for implantation within the aneurysm, the occlusive device having a proximal end, a distal end, and a longitudinal axis, wherein the occlusive device comprises a plurality of filaments that are secured to one another at the proximal end of the occlusive device by a cured material, wherein the cured material has a first region with a first diameter and a second region with a second diameter greater than the first diameter, the second region being distal of the first region along the longitudinal axis of the occlusive device,
   wherein the occlusive device is disposed in a collapsed state within the lumen of the delivery shaft for delivery to the aneurysm and is coupled to the manipulation shaft such that the distal portion of the manipulation shaft is positioned over the first region of the cured material and proximal of the second region of the cured material.

2. The treatment system of Clause 1, wherein the first region of the cured material defines a recess, and wherein the distal portion of the manipulation shaft comprises an interlocking element configured to be received within the recess of the cured material.

3. The treatment system of Clause 1 or Clause 2, wherein the cured material defines a channel extending longitudinally therethrough, and wherein the treatment system further comprises an injection shaft positioned within at least a portion of the manipulation shaft and extends distally through the channel.

4. The treatment system of Clause 3, wherein the injection shaft is configured to receive an embolic composition therethrough.

5. The treatment system of Clause 3 or Clause 4, wherein the injection shaft has a proximal portion having a first outer diameter and a first inner diameter, and a distal portion having a second outer diameter less than the first outer diameter and a second inner diameter less than the first inner diameter, and wherein the proximal portion of the injection shaft terminates distally prior to a proximal edge of the cured material and the distal portion of the injection shaft extends through the channel in the cured material.

6. The treatment system of any one of Clauses 1 to 5, wherein the cured material does not comprise a metal band.

7. The treatment system of any one of Clauses 1 to 6, wherein the occlusive device comprises an inner layer of braided filaments and an outer layer of braided filaments, each having proximal end regions, and wherein the proximal end region of the inner layer extends proximally beyond the proximal end region of the outer layer.

8. The treatment system of Clause 7, wherein:
the first region of the cured material surrounds and secures the portion of the proximal end region of the inner layer extending proximally beyond the outer layer, and
the second region of the cured material surrounds and secures the proximal end regions of both the inner and outer layers.

9. The treatment system of any one of Clauses 1 to 8, wherein the cured material extends radially between the filaments at the proximal end of the occlusive device.

10. A treatment system comprising:
a delivery shaft having a proximal portion, a distal portion, and a lumen extending therethrough, wherein the distal portion is configured to be instravascularly positioned proximate an aneurysm;
a manipulation shaft slidably positioned within the lumen of the delivery shaft, the manipulation shaft having a proximal portion, a distal portion, and an interlocking element at the distal portion; and
an occlusive device configured for implantation within the aneurysm, the occlusive device having a proximal end, a distal end, and a longitudinal axis, wherein the occlusive device comprises a plurality of filaments that are secured to one another at the proximal end of the occlusive device by a cured material, wherein the cured material defines a recess that receives the interlocking element of the manipulation shaft therein,
wherein the interlocking element is configured to be movable in a radial direction into and out of the recess, and
wherein, when the occlusive device is disposed in the delivery shaft, an inner surface defining the lumen of the delivery shaft prevents the interlocking element of the manipulation shaft from lifting radially away from the recess in the occlusive device, thereby securing the occlusive device to the manipulation shaft.

11. The treatment system of Clause 10, wherein, when the occlusive device is pushed proximally out of the delivery shaft such that the cured material is distal of a distal end of the delivery shaft, the interlocking element is free to lift radially away from the cured material, thereby detaching the occlusive device from the manipulation shaft.

12. The treatment system of Clause 10 or Clause 11, wherein the cured material defines a channel extending therethrough, and wherein the treatment system further comprises an injection shaft that is positioned within at least a portion of the manipulation shaft and extends distally through the channel.

13. The treatment system of Clause 12, wherein the injection shaft is configured to receive an embolic composition therethrough.

14. The treatment system of Clause 12 or Clause 13, wherein the injection shaft has a proximal portion having a first outer diameter and a first inner diameter, and a distal portion having a second outer diameter less than the first outer diameter and a second inner diameter less than the first inner diameter, and wherein the proximal portion of the injection shaft terminates distally prior to a proximal edge of the cured material and the distal portion of the injection shaft extends through the channel in the cured material.

15. The treatment system of any one of Clauses 10 to 14, wherein the cured material is does not comprise a metal band.

16. The treatment system of any one of Clauses 10 to 15, wherein the occlusive device comprises an inner layer of braided filaments and an outer layer of braided filaments, each having proximal end regions, and wherein the proximal end region of the inner layer extends proximally beyond the proximal end region of the outer layer.

17. The treatment system of Clause 16, wherein:
the first region of the cured material surrounds and secures the portion of the proximal end region of the inner layer that extends proximally beyond the outer layer, and
the second region of the cured material surrounds and secures the proximal end regions of both the inner and outer layers.

18. The treatment system of any one of Clauses 10 to 17, wherein the cured material extends radially between the filaments at the proximal end of the occlusive device.

19. The treatment system of any one of Clauses 10 to 18, wherein the manipulation shaft includes a plurality of interlocking elements and the cured material comprises a plurality of recesses, each configured to receive an individual one of the interlocking elements.

20. A method comprising:
advancing a delivery system through the vasculature to a treatment site proximate an aneurysm, the delivery system comprising a delivery shaft, a manipulation shaft positioned within the delivery shaft, and an occlusive device positioned in a collapsed stated within the delivery shaft, wherein the occlusive device comprises a plurality of braided filaments secured to one another at a proximal end of the occlusive device by a cured material, and wherein a distal portion of the manipulation shaft extends over at least a portion of the cured material securing the occlusive device to the manipulation shaft;
detaching the occlusive device from the manipulation shaft by withdrawing the delivery shaft proximally beyond the cured material, thereby exposing the distal portion of the manipulation shaft and allowing the distal portion to lift radially away from the cured material.

21. The method of Clause 20, wherein the delivery system further comprises an injection shaft having a distal region that extends distally through a channel in the cured material, and wherein the method further comprises delivering an embolic material through the injection shaft while at least a portion of the occlusive device is expanded within the aneurysm.

22. A treatment system comprising:
a delivery shaft having a proximal portion, a distal portion, and a lumen extending therethrough, wherein the distal portion is configured to be instravascularly positioned proximate an aneurysm;
a manipulation shaft slidably positioned within the lumen of the delivery shaft, the manipulation shaft having a proximal portion and a distal portion; and
an occlusive device configured for implantation within the aneurysm, the occlusive device having a proximal end, a distal end, and a longitudinal axis, wherein the occlusive device comprises a plurality of filaments that are secured to one another at the proximal end of the occlusive device by a cured material, wherein the occlusive device comprises an inner layer of braided filaments and an outer layer of braided filaments, each having proximal end regions, and wherein the proximal end region of the inner layer has an exposed portion that extends proximally beyond the proximal end region of the outer layer, and wherein the cured material extends into and fills interstices between the braided filaments at the proximal end regions of the inner and outer layers, and wherein the occlusive device is disposed in a collapsed state within the lumen of the delivery shaft for delivery to the aneurysm and is coupled to the manipulation shaft such that the distal portion of the manipulation shaft is positioned over the exposed portion of the inner layer and proximal of the proximal end region of the outer layer.

23. The treatment system of Clause 22, wherein the cured material has a first region with a first diameter and a second region with a second diameter greater than the first diameter, the second region being distal of the first region along the longitudinal axis of the occlusive device.

24. The treatment system of Clause 23, wherein:
the first region of the cured material surrounds and secures the portion of the proximal end region of the inner layer extending proximally beyond the outer layer, and
the second region of the cured material surrounds and secures the proximal end regions of both the inner and outer layers.

25. The treatment system of Clause 23, wherein the first region of the cured material defines a recess, and wherein the distal portion of the manipulation shaft comprises an interlocking element configured to be received within the recess of the cured material.

26. The treatment system of any one of Clauses 21 to 25, wherein the cured material defines a channel extending longitudinally therethrough, and wherein the treatment system further comprises an injection shaft positioned within at least a portion of the manipulation shaft and extends distally through the channel.

27. The treatment system of Clause 26, wherein the injection shaft is configured to receive an embolic composition therethrough.

28. The treatment system of Clause 26, wherein the injection shaft has a proximal portion having a first outer diameter and a first inner diameter, and a distal portion having a second outer diameter less than the first outer diameter and a second inner diameter less than the first inner diameter, and wherein the proximal portion of the injection shaft terminates distally prior to a proximal edge of the cured material and the distal portion of the injection shaft extends through the channel in the cured material.

29. The treatment system of any one of Clauses 21 to 28, wherein the cured material does not comprise a metal band.

30. The treatment system of any one of Clauses 21 to 29, wherein the cured material forms a first layer over the exposed portion of an outer surface of the inner layer and a second layer over a radially inner surface of the inner layer.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

FIG. 2A is a partially schematic view of a system for treating an aneurysm in accordance with embodiments of the present technology.

FIG. 2B is a partially schematic enlarged cross-sectional view of a distal portion of the system shown in FIG. 2A.

In FIG. 2E, the delivery shaft and injection shaft have been removed for ease of illustration.

In FIG. 4, the system is shown in a secured delivery configuration.

In FIG. 4, the system is shown at an intermediate stage of releasing the implant.

In FIG. 7, the system is shown in a secured delivery configuration.

In FIG. 8, the system is shown at an intermediate stage of releasing the implant.

DETAILED DESCRIPTION

The present technology is directed to devices, systems, and methods for delivering an occlusive device and an embolic fluid to a treatment location in a blood vessel (such as an aneurysm). In some embodiments, the technology comprises delivering the occlusive device to a treatment location via a delivery system and, before detaching the occlusive device from the delivery system, delivering the embolic fluid through a proximal end of the occlusive device into the aneurysm. In order to preserve a large internal diameter through the occlusive device (to reduce the pressure required to push the embolic fluid), it is beneficial to minimize the number and/or size of components at the proximal end. This can be especially difficult, however, when the occlusive device comprises a plurality of braided and/or woven filaments. The free ends of the filaments need to be constrained so that the braid does not unravel and to prevent breaking or damage to individual filaments within the delivery system or once deployed in the aneurysm.

Figure 1:
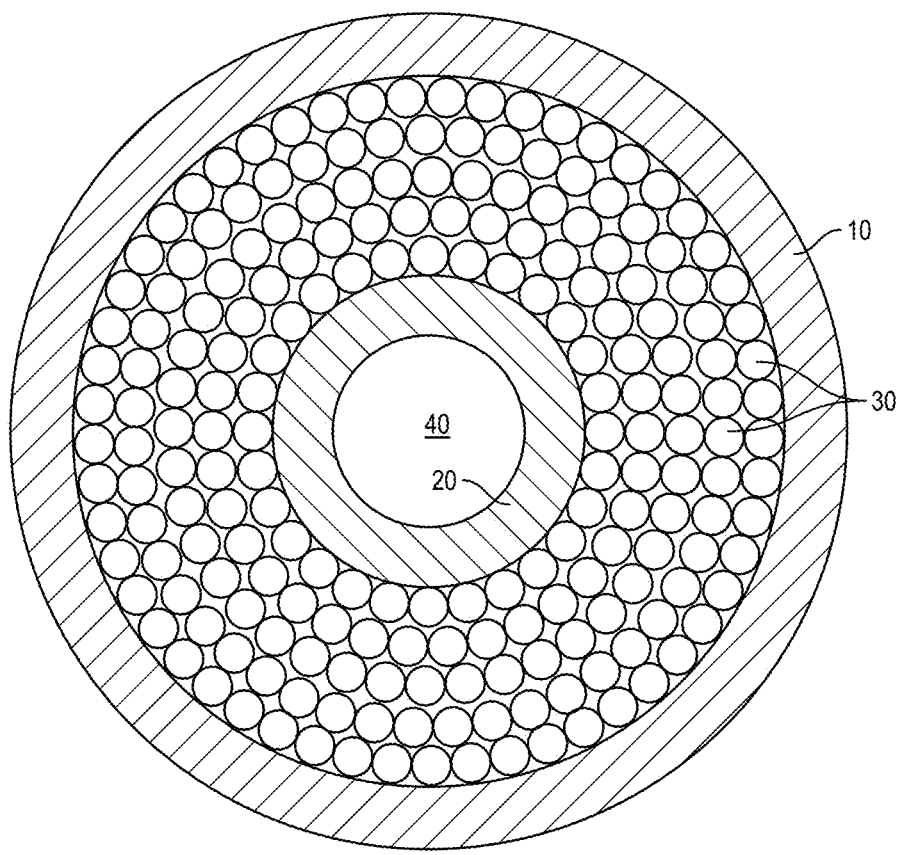
FIG. 1 is an axial cross-sectional view of a secured portion of an occlusive device of the prior art.

Conventional methods for constraining the free ends while maintaining a central lumen typically include sandwiching the filament ends between two metal bands. An example of such a prior art assembly is shown in the axial cross-sectional view of FIG. 1. The filament ends 30 are positioned between an outer metal band 10 and an inner metal band 20, and a lumen 40 extends through and is defined by the inner metal band 20. One of the drawbacks of this method is that the space occupied by the metal bands reduces the diameter of the flow channel for the embolic fluid. For example, the minimum wall thickness of each band ranges from 0.001-0.002 inches, which results in a buildup of a minimum of 0.002-0.004 inches through one side of the bands. Together the inner and outer bands thus occupy a minimum of 0.004-0.008 inches, which is approximately 25-50% of the total available space in, for example, a delivery catheter having a inner diameter (which is the smallest existing commercial microcatheter).

To reduce the buildup of wall thicknesses or additional components inside of the delivery catheter, the occlusive devices of the present technology are secured at their proximal ends by a cured material and do not include any bands or other mechanical restraints. The cured material may add only a nominal amount to the overall thickness/diameter of the bundled filaments, thus providing 25-50% more space within the delivery catheter (relative to bands) that can be used to enlarge the fluid channel running through the secured filament ends. The cured material provides the additional advantage of being moldable to include one or more features that engage with the delivery system to facilitate detachment of the occlusive device, as described in greater detail below.

I. Overview of Treatment Systems of the Present Technology

FIG. 2A shows a system 100 for treating aneurysms, such as cerebral aneurysms, according to one or more embodiments of the present technology. FIG. 2B is an enlarged cross-sectional view of the distal portion of the system 100. As shown in FIGS. 2A and 2B, the system 100 comprises a delivery system 101, an occlusive device 120 (shown in a collapsed delivery configuration), and an embolic kit 200. In some embodiments the system 100 does not include the embolic kit 200. The occlusive device 120 is configured to be detachably coupled to the delivery system 101, and the delivery system 101 is configured to intravascularly position the occlusive device 120 within an aneurysm. The occlusive device 120 can have a collapsed configuration for delivery through a catheter to the aneurysm (as shown in FIG. 2B) and an expanded, deployed state for implantation in the aneurysm cavity.

The embolic kit 200 can comprise an embolic composition 202 and an injector device 204 ("injector 204") configured to be fluidly coupled to a proximal portion of the delivery system 101 for injection of the embolic composition 202 into the aneurysm cavity. The embolic composition 202 can be delivered to a space between the occlusive device 120 and the dome of the aneurysm to fill and occlude the aneurysm cavity. Additionally or alternatively, the embolic composition 202 can be delivered to an interior region of the occlusive device 120 once the occlusive device 120 has been at least partially deployed in the aneurysm. The occlusive device 120 prevents migration of the embolic composition 202 into the parent vessel, and together the occlusive device 120 and embolic composition 202 prevent blood from flowing into the aneurysm. Bioabsorption of the embolic composition 202 and endothelialization of the occlusive device 120 cause the aneurysm wall to fully degrade, leaving behind a successfully remodeled (aneurysm free) region of the blood vessel.

The embolic composition 202 can be any material suitable for forming a solid or semi-solid structure (e.g., a hydrogel) that partially or completely occludes the interior cavity of the aneurysm. For example, the embolic composition 202 can include one or more polymers, such as a synthetic polymer (e.g., poly(glycolide), poly(lactide), poly(vinyl alcohol)), a biopolymer (e.g., chitosan, gelatin, silk, cellulose, alginate, hyaluronic acid), or a combination thereof. The embolic composition 202 can optionally include one or more components to facilitate gelation and/or enhance storage stability, such as cross-linking agents, stabilizers, thickeners, spacers, etc. Optionally, the embolic composition 202 can include a contrast agent to enable visualization (e.g., iohexol, iopromide, ioversol, iopamidol, iodixanol, ioxilan, iothalamate/meglumine, ioxaglate/meglumine, diatrizoate/meglumine). The embolic composition 202 can be biodegradable or non-biodegradable.

Referring still to FIGS. 2A and 2B, the delivery system 101 has a proximal portion 101a configured to be extracorporeally positioned during treatment and a distal portion 101b configured to be intravascularly positioned at or within an aneurysm. The delivery system 101 may include a handle 102 at the proximal portion 101a and a plurality of elongated shafts extending between the handle 102 and the distal portion 101b. For example, the delivery system 101 may include a delivery shaft 108 (such as a microcatheter) and a manipulation shaft 110 (FIG. 2B) configured to be slidably disposed within a lumen of the delivery shaft 108. The system 101 may optionally include an injection shaft 112 (FIG. 2B) configured to be disposed within a lumen of the manipulation shaft 110. In such embodiments, the injection shaft 112 can be slidably disposed within the lumen of the manipulation shaft 110, or the manipulation and injection shafts 110, 112 are fixed to one another. The delivery system 101 and/or the manipulation shaft 110 is configured to be detachably coupled at its distal end portion to the occlusive device 120, as described in greater detail below with reference to FIGS. 3-8.

The manipulation shaft 110 can have a proximal portion at the handle 102 and a distal portion 111 that is configured to releasably engage a portion of the occlusive device 120 to secure the occlusive device 120 to the delivery system 101. The manipulation shaft 110 can be movable within the delivery shaft 108 to position the occlusive device 120 at a desired location. The manipulation shaft 110 can be sufficiently flexible to enable manipulation, e.g., advancement and/or retraction, of the occlusive device 120 through tortuous passages.

The injection shaft 112 can have a proximal portion at the proximal portion 101a of the delivery system 101 (e.g., at the handle 102) and a distal portion 115 that terminates within the occlusive device 120, as shown in FIG. 2B. The proximal portion of the injection shaft 112 is configured to be fluidly coupled to the injector 204 (for example, via a port 104 on the handle 102) or other device containing the embolic composition 202. Pressure generated at the injector 204 causes the embolic composition 202 to flow through the lumen of the injection shaft 112 and into a space distal of the proximal end of the occlusive device 120, for example to an interior region of the occlusive device 120 or to a space between a portion of the occlusive device 120 and the aneurysm dome. Once the embolic composition 202 has sufficiently filled the aneurysm cavity and/or occlusive device 120, the occlusive device 120 can be detached from the delivery system 101. The delivery system 101, including the injection shaft 112, can then be withdrawn from the treatment site. In some embodiments, the lumen of the injection shaft 112 can be configured to receive a guidewire therethrough.

In some embodiments, the injection shaft 112 does not extend proximally back to the proximal portion 101a of the delivery system 101 and instead terminates proximally at an intermediate location along the lumen of the manipulation shaft 110. For example, the injection shaft 112 can be an extension tube (not shown) that is attached to the distal end of the manipulation shaft 110. A proximal end of the injection shaft 112 can reside, and be fixed to, an inner surface of the manipulation shaft 110 that defines the manipulation shaft lumen, and a distal end of the injection shaft 112 extends beyond the distal end of the manipulation shaft 110. In such embodiments, the proximal portion of the manipulation shaft 110 can be configured to be fluidly coupled to the injector 204 (or other source of the embolic composition 202), and the lumen of the manipulation shaft 110 can be configured to receive the embolic composition and transfer the embolic composition to the injection shaft 112.

Figure 2C:
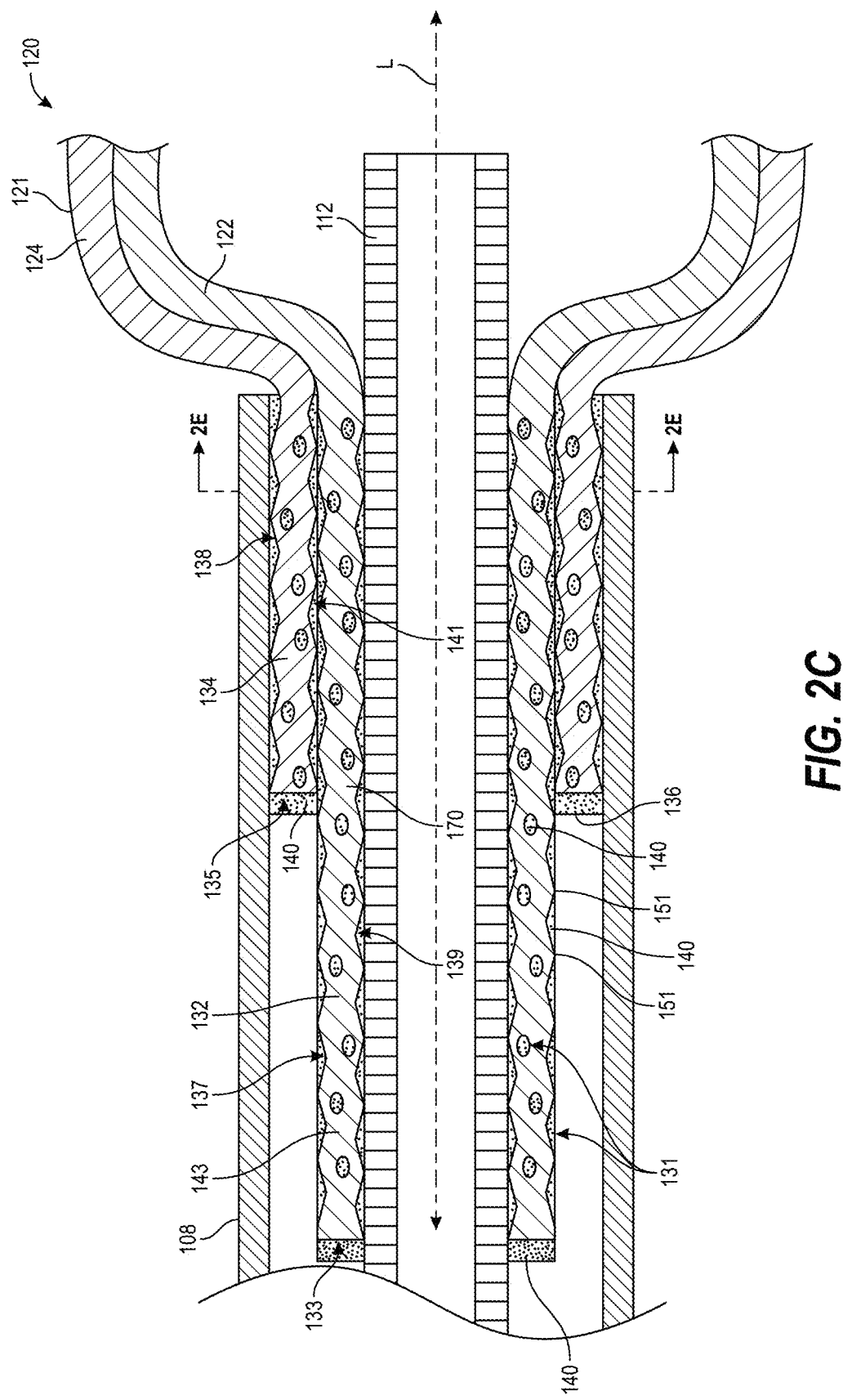
FIG. 2C is a partially schematic view of the proximal portion of an occlusive device engaged with a delivery system configured in accordance with several embodiments of the present technology.

FIG. 2C shows a cross-sectional view of a portion of the occlusive device 120. The occlusive device 120 is shown partially deployed in FIG. 2C with a proximal portion remaining within the delivery shaft 108 and the occlusive device 120 remains coupled to the delivery system 101. The manipulation shaft 110 has been removed in FIG. 2C for ease of illustration. The occlusive device 120 can comprise a resilient mesh 121 formed of a plurality of braided and/or woven filaments that have been shape set to assume a desired three-dimensional shape when unconstrained (e.g., released from the delivery shaft 108). The mesh 121 can have any shape or size in the expanded state that enables the mesh 121 to cover the aneurysm neck, and a porosity sufficient to prevent leakage of the embolic composition 202 into the parent vessel. Representative examples of meshes that are suitable for use with the system 100 are described in U.S. Pat. Nos. 8,142,456, 9,855,051, 10,327,781, U.S. Patent Application Publication No. 2020/0187953, U.S. Patent Application Publication No. 2021/0128169, and U.S. Patent Application Publication No. 2021/0153872, U.S. application Ser. No. 63/369,936, filed Jul. 30, 2022, and titled DEVICES, SYSTEMS AND METHODS FOR TREATING ANEURYSMS, the disclosures of which are incorporated by reference herein in their entireties.

The mesh 121 may be formed of metal wires, polymer wires, or both, and the wires may have shape memory and/or superelastic properties. The mesh 121 may be formed of 24, 32, 36, 48, 64, 72, 96, 128, or 144 filaments. The mesh 121 may be formed of a range of filament or wire sizes, such as wires having a diameter of from about 0.0004 inches to about 0.0020 inches, or of from about 0.0009 inches to about 0.0012 inches. In some embodiments, each of the wires or filaments have a diameter of about 0.0004 inches, about 0.0005 inches, about 0.0006 inches, about 0.0007 inches, about 0.0008 inches, about 0.0009 inches, about 0.001 inches, about 0.0011 inches, about 0.0012 inches, about 0.0013 inches, about 0.0014 inches, about 0.0015 inches, about inches, about 0.0017 inches, about 0.0018 inches, about 0.0019 inches, or about inches.

As best shown in FIG. 2C, in some embodiments the mesh 121 can comprise inner and outer layers 122, 124, each comprising a plurality of braided and/or woven filaments. The inner and outer layers 122, 124 can have respective proximal end regions 132, 134 that come together at a proximal region of the occlusive device 120. The distal ends of the inner and outer layers 122, 124 (not shown) may be attached to one another at the distal end of the occlusive device 120, or may be secured separately and/or spaced apart from one another.

Each of the proximal end regions 132, 134 terminates proximally at a respective proximal terminus 133, 135. As shown in FIG. 2C, in some embodiments the first and second proximal end regions and/or termini are staggered along the longitudinal axis of the device 120 such that the proximal terminus 133 of the inner layer 122 is proximal of and spaced apart from the proximal terminus 135 of the second or outer layer 124. As such, the proximal end region 132 of the inner layer 122 can include an exposed portion 143 that does not radially overlap the proximal end region 134 of the outer layer 124 and a covered portion 170 that radially overlaps the proximal end region 134 of the outer layer 124. In some embodiments, the proximal terminus 135 of the outer layer 124 is proximal of and spaced apart from the proximal terminus 133 of the inner layer 122.

Figure 2D:
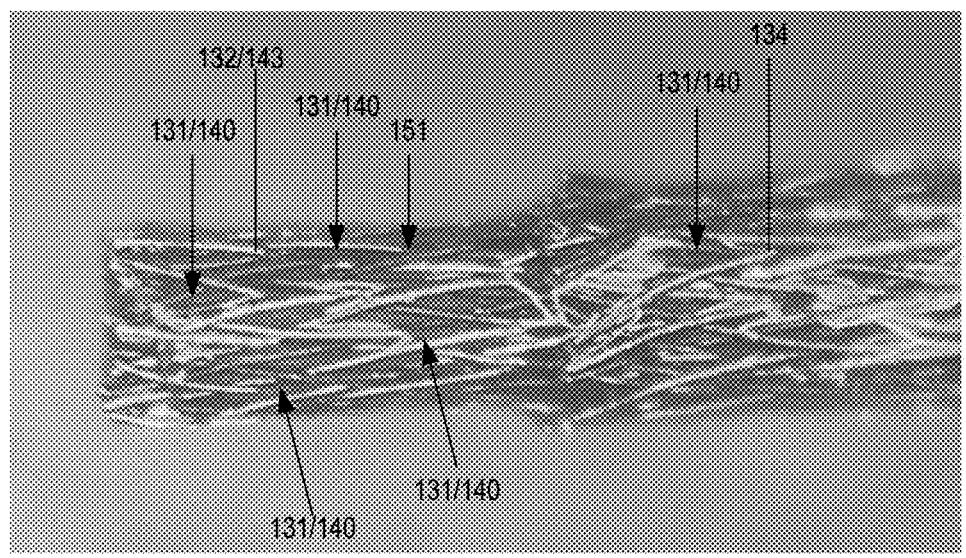
FIG. 2D is a photograph showing the proximal regions of the inner and outer layers as secured by a cured material in accordance with several embodiments of the present technology.

The occlusive device 120 can further include a cured material 140 that extends between and holds together the filaments of the first and second proximal end regions 132, 134 of the inner and outer layers 122, 124. For example, as shown in FIGS. 2C and 2D, the cured material 140 can be disposed within and/or fill the interstices 131 between the filaments comprising the mesh 121 such that the filaments and the cured material 140 together form a composite structure at the proximal end of the occlusive device 120. The cured material 140 can be applied to the proximal end regions 132, 134 in a flowable form (e.g., via insert molding, overmolding, injection molding, reflow, etc.) that beneficially allows for the material to flow into and/or through the interstices between the layers and/or filaments, and also allows for control of the final shape and thickness of the cured material 140.

Figure 2E:
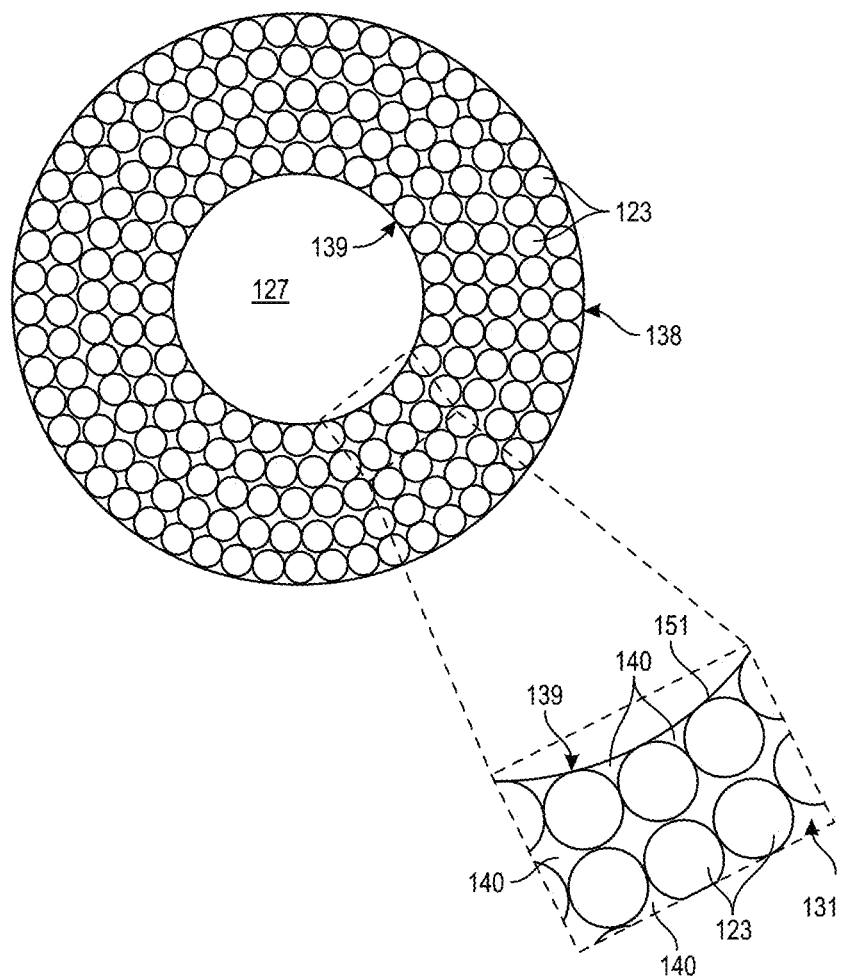
FIG. 2E is a cross-sectional axial view taken along line 2E-2E in FIG. 2C.

Depending on the delivery system requirements and method of manufacturing, the cured material 140 may be confined to the spaces 131 under and between the outermost surfaces 151 (FIGS. 2D and 2E) of the bundled filaments 123 and generally may not be disposed over and/or on the outermost surfaces 151 (for example, if the outermost surfaces 151 are in contact with a mold or other element during an insert molding or reflow process). In some embodiments, the cured material 140 is disposed within the spaces 131 under and between the outermost surfaces 151 (FIGS. 2D and 2E) of the bundled filaments 123 and over and/or on the outermost surfaces 151 along all or a portion of a radially outer surface 138 of the proximal end region 134 of the outer layer 124, a radially outer surface 137 of the proximal end region 132 of the inner layer 122, a radially inner surface 139 of the inner layer 122, a radially inner surface 141 of the outer layer 124, and/or over each of the proximal termini 133, 135.

According to several aspects of the present disclosure, for example as shown in FIGS. 2C and 2D, in some embodiments the cured material 140 is disposed only within the interstices 131 (shown schematically) between adjacent filaments 123 (FIG. 2D), which includes gaps between filaments along the individual layers as well as at the interface between the radially outer surface 137 of the inner layer 122 and the radially inner surface 138 of the outer layer 124 where the inner and outer layers 122, 124 overlap. In several of such embodiments, the cured material 140 is not disposed on the outer surface 137 of the exposed portion 143 of the inner layer 122, the radially outer surface 138 of the outer layer 124, and/or the radially inner surface 139 of the inner layer 122. While the cured material 140 may exist at or near the radially outer surface of the foregoing portions by filling in gaps 131 between filaments at the respective surface, the cured material 140 does not form a layer of material over the filaments. In these and other embodiments in which the cured material 140 does not form a layer over the radially inner surface of the inner layer 122, the outermost filament surfaces 151 and the cured material 140 between the outermost filament surfaces 151 together define a lumen 127 (FIG. 2E) extending through the secured proximal end regions 132, 134 and through which the injection shaft 112 can be positioned. In contrast to the bands of the prior art (see FIG. 1), the proximal end regions 132, 134 of the filaments of the present technology are secured without adding to the existing outer diameter defined by the bunched filaments and without taking away from the inner diameter extending through the bunched filaments.

Figure 2F:
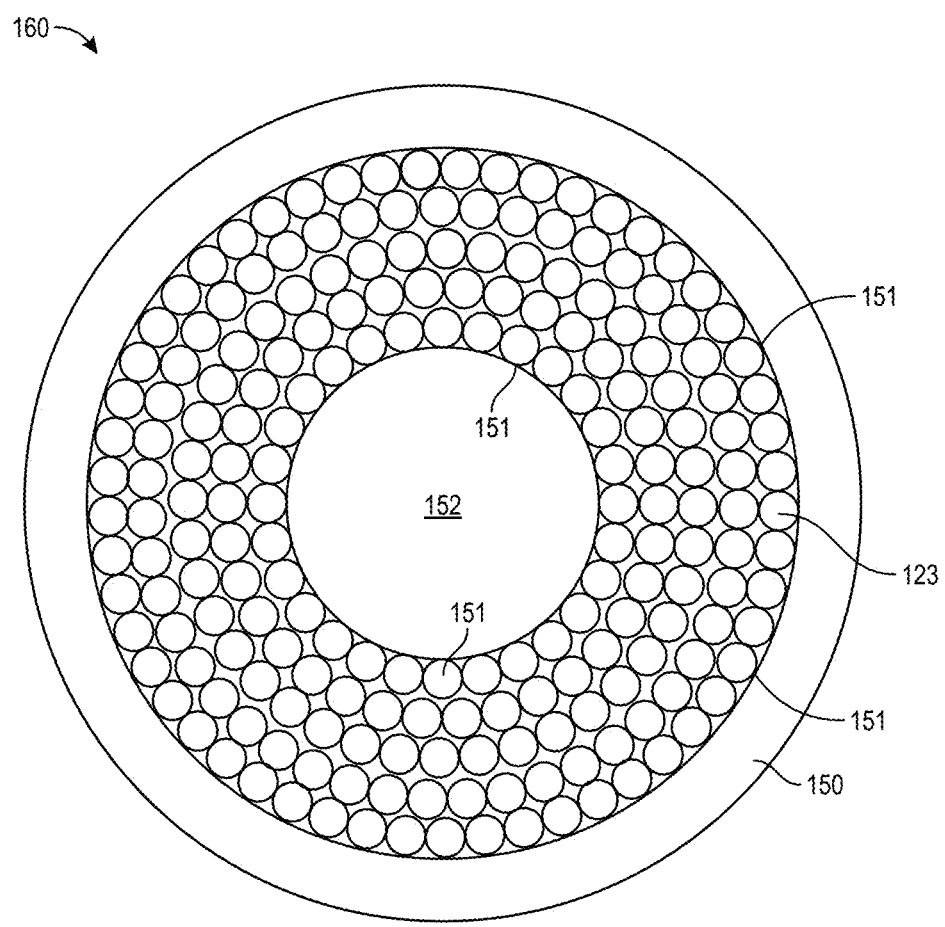
FIG. 2F is a cross-sectional axial view of a mold assembly configured in accordance with several embodiments of the present technology.

According to some embodiments, the composite structure shown in FIGS. 2C and 2D can be formed by an overmolding process, such as insert molding, injection molding, etc. As shown in FIG. 2F, the mold assembly 160 can comprise an outer member 150 having a lumen that approximates what will be the outer diameter of the composite structure and an inner member 152 having an outer diameter that approximates what will be the outer diameter of the injection shaft 112. The proximal end regions 132, 134 can be inserted into the mold, between the outer and inner members 150, 152, and the liquid form of the cured material can be injected between the outer and inner members 150, 152 and allowed to cure (e.g., harden, solidify, etc.). As demonstrated by FIGS. 2E and 2F, because the filaments 123 are sandwiched tightly between the outer member 150 and the inner member 152, the portions of the surfaces of the filaments that are pressed against the outer or inner member 150, 152 (such as outermost surfaces 151, only a few labeled) may not have any cured material 140 thereon when the filaments 123 are removed from the mold. The material can be any suitable curable material, such as an injectable adhesive, liquid plastic, and/or other composite material. In some embodiments, the material is a UV-curable epoxy. In some embodiments, the cured material 140 is a monolithic body.

Figure 2G:
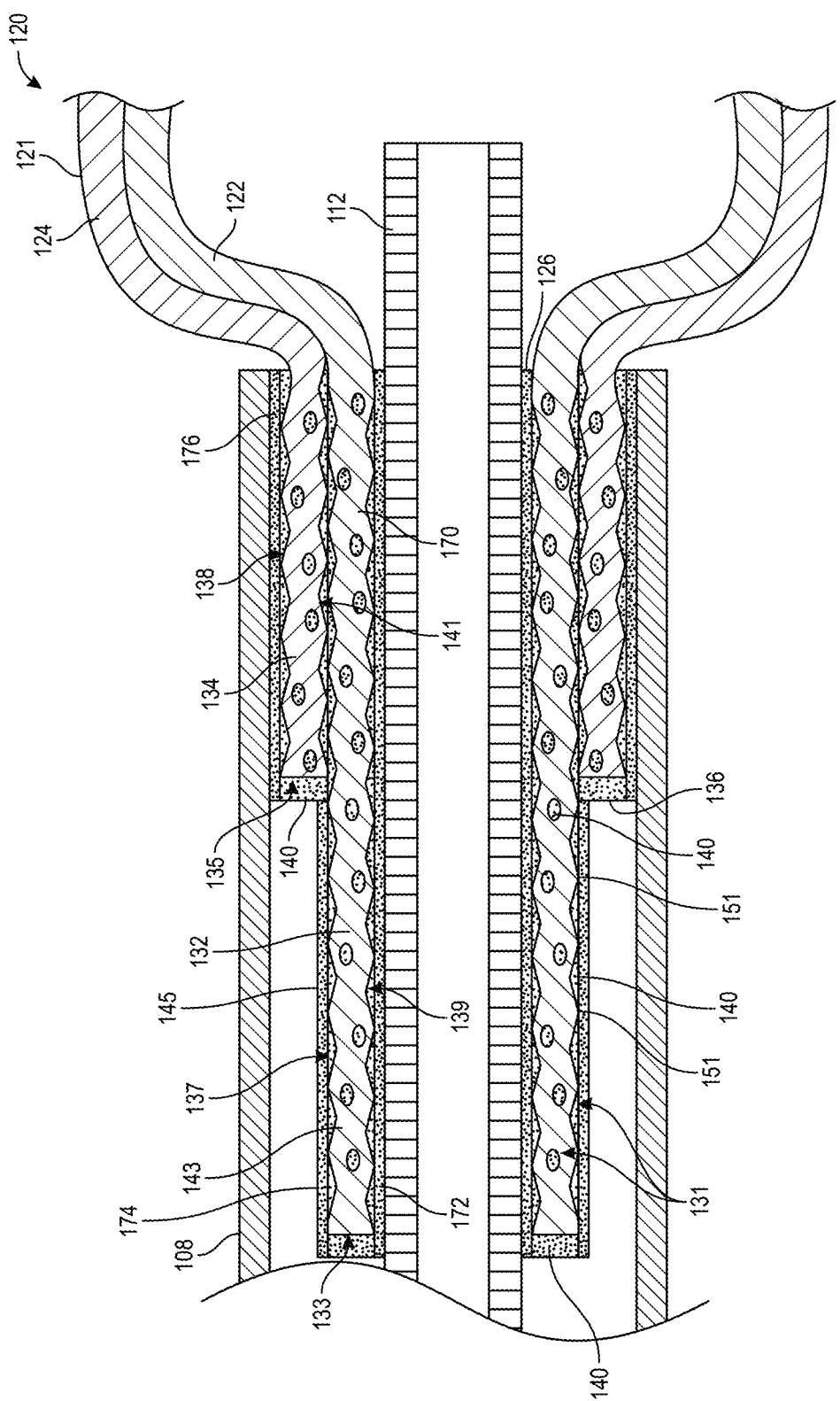
FIG. 2G is a partially schematic view of the proximal portion of an occlusive device engaged with a delivery system configured in accordance with several embodiments of the present technology.

Referring to FIG. 2G, in some embodiments the cured material 140 forms at least one of a first layer 176 on and along all or a portion of a radially outer surface 138 of the proximal end region 134 of the outer layer 124, a second layer 174 on and along all or a portion of a radially outer surface 137 of the proximal end region 132 of the inner layer 122, and/or a third layer 172 on and along all or a portion of a radially inner surface 139 of the inner layer 122. The layers 172, 174, and 176 can be disposed on top of the outermost surfaces 151 of the filaments and the cured material 140 within interstices 131. In such embodiments in which the cured material 140 forms a layer 172 over the radially inner surface of the inner layer 122 along the proximal end region 132, the cured material 140 defines a lumen 126 extending through the secured proximal end regions 132, 134 and through which the injection shaft 112 can be positioned. In contrast to a conventional metal band, the cured material 140 can conform to the step created by the staggered proximal ends 132, 134.

According to some methods of manufacturing, the layers of the composite structure of FIG. 2G can be formed by reflowing a solid material over the filaments. The solid material can be a thermoplastic material, such as Pebax®, polyolefin, polyvinyl chloride (PVC), a fluoropolymer, polytetrafluoroethylene (PTFE), fluorinated ethylene propylene (FEP), Kynar®, Viton®, and/or others. In some embodiments, a first layer of solid material (in the form of a wrap, a tube, strips, etc.) can be placed on the outer surface of the inner member 152 (see FIG. 2F) of the mold and the inner and outer layers 122, 124 are placed over the first layer. A second layer of solid material (in the form of a wrap, a tube, strips, etc.) can be placed over the proximal end regions of the inner and outer layers 122, 124 and a shrink tube (e.g., PTFE, etc.) is placed over the entire assembly. Heat is then applied to the assembly so that the shrink tube generates a radial inward force while the thermoplastic layers melt into the voids of the braid, which once hardened creates a composite structure comprising the filaments and the cured material.

The finished assembly includes a layer of cured material 140 on the radially outer surface 138 of the outer layer 124 (formed by reflowing the second layer) and a layer of cured material 140 on the radially inner surface of the inner layer 122 (formed by reflowing the first layer). In some embodiments, other techniques can be used to form one, some, or all of the layers 172, 174, 176, such as an overmolding process that utilizes a standoff between the filaments and the mold surfaces.

Referring to FIG. 2G, because of the staggered arrangement of the proximal end regions 132, 134 of the mesh 121, an outer diameter of the composite structure along the second layer 174 of the cured material 140 is greater than an outer diameter of the composite structure along the second region 144, thereby forming a shelf 145 in the cured material 140. The shelf 145 can be defined by the second layer 174 and a proximally facing annular surface 136 formed by the step between the second and first layers 174, 176. As detailed below, the shelf 145 formed by the cured material 140 can be engaged by the manipulation shaft 110 (FIG. 2B) to secure the occlusive device 120 to the manipulation shaft 110 and/or as leverage to push the occlusive device 120 out of the manipulation shaft 110.

It will be appreciated that the cured material 140 can be used with single-layer occlusive devices as well as multilayer occlusive devices without staggered proximal ends (i.e., with aligned proximal ends). While the topography created by the staggered mesh layers can help in forming the shelf 145 in the cured material 140, the cured material 140 can be molded during manufacture to include any shape, including a shelf 145, regardless of the underlying mesh topography. Moreover, in any of the foregoing embodiments, the cured material 140 can be loaded with radiopaque materials, such as barium sulfate, bismuth subcarbonate, and the like to enhance intra-operative visualization.

II. Selected Embodiments of Detachment Regions and Methods of Use

Figure 4:
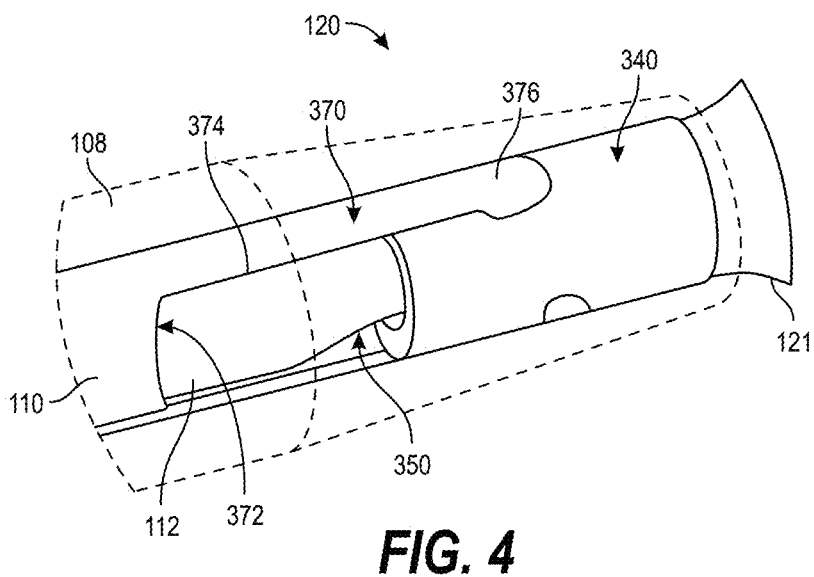
FIG. 4 is a partially transparent, perspective view of the distal portion shown in FIG. 3.
Figure 5:
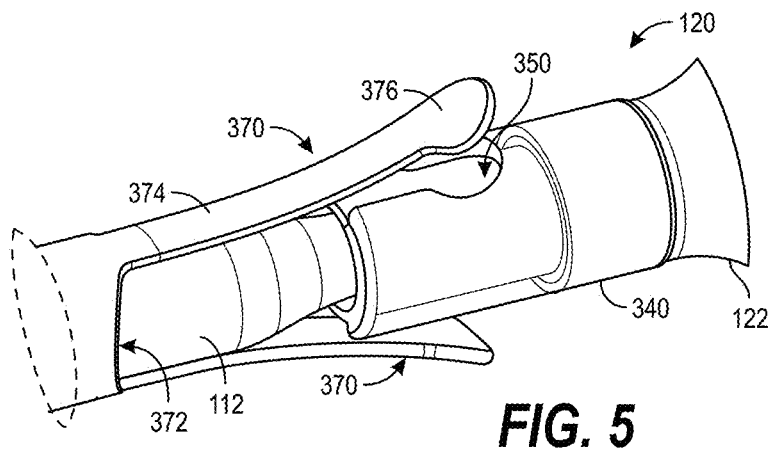
FIG. 5 is a partially transparent, perspective view of the distal portion shown in FIG. 3.

The cured material 140 of the present technology and/or the composite structures formed of the cured material 140 and filaments can be configured to engage with one or more components of the delivery system 101 to releasably secure the occlusive device 120 to the delivery system 101. For example, as shown in the delivery system 301 of FIGS. 3-5, in some embodiments the cured material 340 can be configured to releasably interlock with a distal portion 111 of the manipulation shaft 110 (FIG. 2B) to secure the occlusive device 120 to the delivery system 101. The cured material 340 can have the same features as the cured material 140 discussed above with reference to FIGS. 2A-2G, except the shelf 145 of the cured material 340 includes one or more recesses 350 (best shown in FIG. 5). Likewise, the delivery system 301 can have the same features and components as the delivery system 101, except the distal portion 111 of the manipulation shaft 110 of delivery system 301 includes one or more interlocking elements 370 that are configured to be received by the recesses 350 in the cured material 140. When the interlocking elements 370 are positioned within the recesses 350 of the cured material 140 and the delivery shaft 108 is positioned radially over the interlocking elements 370, the delivery shaft 108 prevents the interlocking elements 370 from lifting out of the recesses 350, thus securing the occlusive device 120 to the delivery system 101. As shown in FIG. 5, when the occlusive device 120 is advanced distally such that the interlocking elements 370 are positioned distal of the distal end of the delivery shaft 108, the interlocking elements 370 are free to lift away from the recesses 350, thereby allowing the delivery system 101 to be withdrawn proximally and disengaged from the occlusive device 120.

Figure 3:
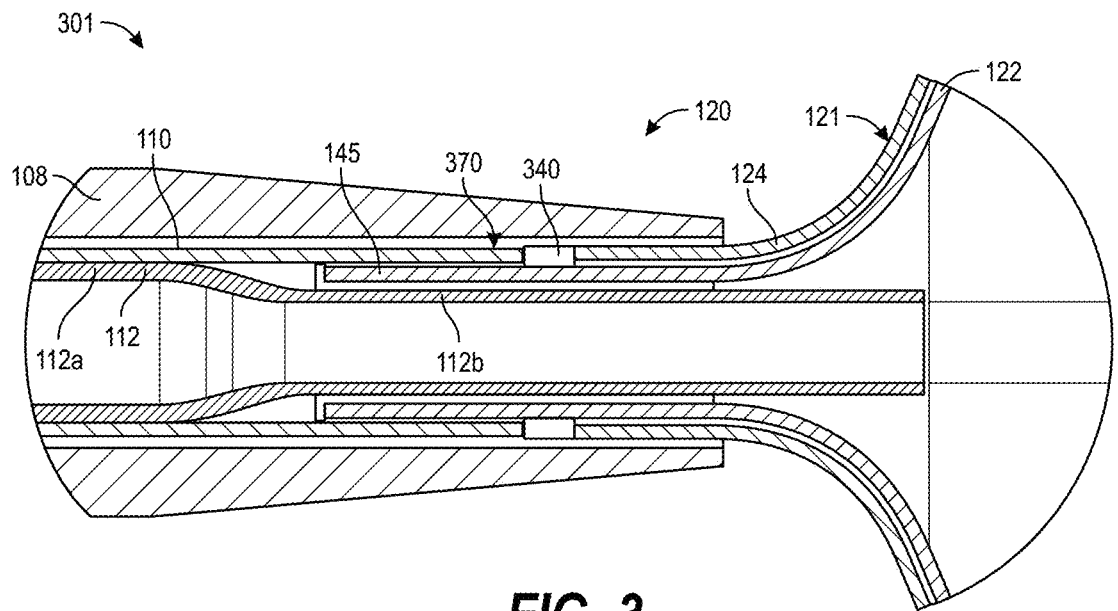
FIG. 3 is a cross-sectional view of a distal portion of a system for treating an aneurysm in accordance with embodiments of the present technology.

In some embodiments the manipulation shaft 110 has a distal edge 372 (FIGS. 4 and 5) and the interlocking elements 370 comprise a plurality of tabs extending distally away from the edge 372. Although two interlocking elements 370 are shown in FIGS. 3-5, the manipulation shaft 110 can have any number of interlocking elements 370 (e.g., one interlocking element, three interlocking elements, four interlocking elements, five interlocking elements, six interlocking elements, etc.). Each of the interlocking elements 370 can comprise a stem 374 that extends longitudinally away from the distal edge 372 and a head 376 disposed at a distal end of the stem 374. The recesses 350 can have a complementary shape to that of the interlocking elements 370. The head 376 can have a width that is greater than a width of the stem 374 such that a proximally facing surface of the head 376 abuts a distally facing surface of the cured material 140 that defines the recess 350. As such, the cured material 140 prevents the interlocking elements 370 from sliding proximally relative to the cured material 140 and/or occlusive device 120 when the interlocking elements 370 are sitting in the recesses 350. Accordingly, when the interlocking elements 370 are positioned within the lumen of the delivery shaft 108 and prevented from lifting out of the recesses 350, distal movement of the manipulation shaft 110 pushes the occlusive device 120 distally (e.g., to push the occlusive device 120 out of the delivery shaft 108 and into the aneurysm) and proximal movement of the manipulation shaft 110 pulls the occlusive device 120 proximally (e.g., to resheath the occlusive device 120 back into the delivery shaft 108 as needed for repositioning).

It will be appreciated that the interlocking elements 370 can have shapes and configurations other than those shown in FIGS. 3-5. For example, in some embodiments one, some, or all of the interlocking portions 330 can have a substantially constant width along their lengths. According to several embodiments, the heads 376 can have a non-circular or rounded shape, such as a T-shape. Likewise, the recesses 350 in the cured material 140 can have other suitable shapes.

Because the inner diameter of the manipulation shaft 110 is greater than the inner diameter of the channel extending through the cured material 340, the outer diameter of the injection shaft 112 can be tapered proximally. In some embodiments, both the outer diameter and the inner diameter of the injection shaft 112 can be tapered proximally. For example, as shown in FIG. 3, the injection shaft 112 can have a first, more proximal portion 112a having first outer and inner diameters, and a second, more distal portion 112b having second outer and inner diameters that are less than the outer and inner diameter, respectively, of the first portion 112a.

Figure 6:
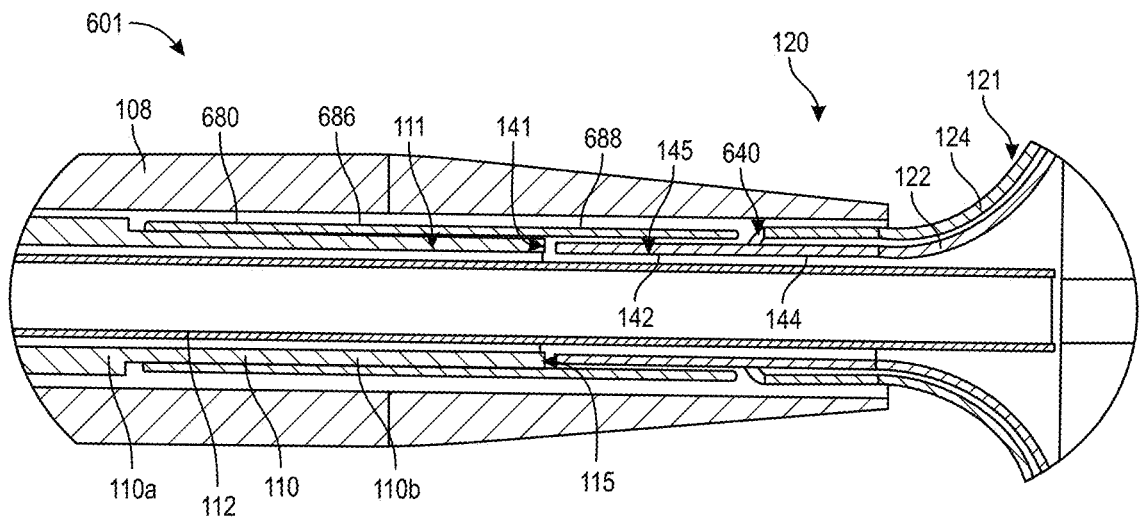
FIG. 6 is a cross-sectional view of a distal portion of a system for treating an aneurysm in accordance with embodiments of the present technology.
Figure 7:
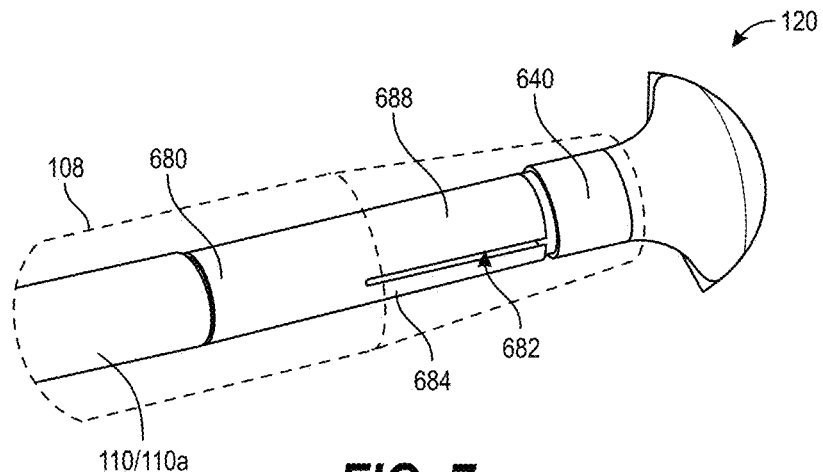
FIG. 7 is a partially transparent, perspective view of the distal portion shown in FIG. 6.
Figure 8:
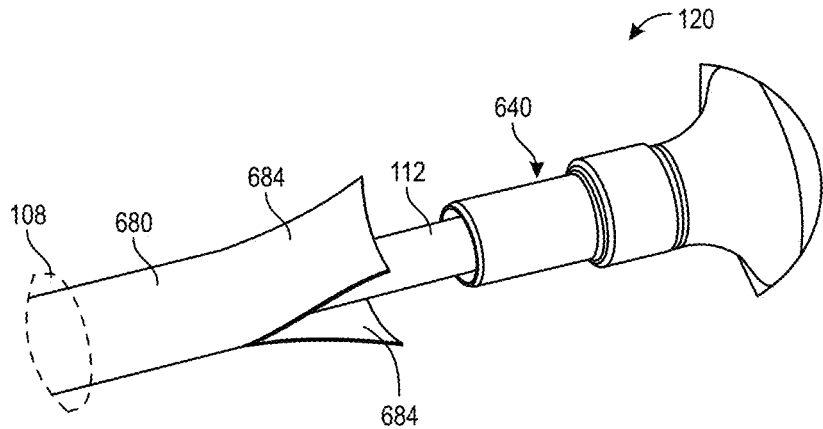
FIG. 8 is a partially transparent, perspective view of the distal portion shown in FIG. 6.

FIGS. 6-8 show another embodiment of a delivery system 601 that includes a tube 680 extending between the distal portion 111 of the manipulation shaft 110 and a proximal portion of the cured material 140. The cured material 640 can have the same features as the cured material 140 discussed above with reference to FIGS. 2A-2C. Likewise, the delivery system 601 can have the same features and components as the delivery system 101, except the distal portion 111 of the manipulation shaft 110 of the delivery system 601 has a reduced outer diameter relative to the remainder of the manipulation shaft 110. For example, the manipulation shaft 110 can have a proximal portion 117 having a first diameter and the distal portion 111 can have a second diameter that is less than that of the proximal portion 117. In some embodiments, the reduced diameter of the distal portion 111 can be substantially the same as the diameter of the composite structure along the second layer 174 of the cured material 140. An inner diameter of the manipulation shaft 110 can remain the same between the proximal and distal portions 117, 111.

In some embodiments, a proximal portion 686 of the tube 680 is bonded to the distal portion 111 of the manipulation shaft 110 while the distal portion 688 of the tube 680 is not adhered to the shelf 145 (FIG. 6) of the cured material 640 and is held to the cured material 640 only by the constraining force of the inner surface of the delivery shaft 108. In some embodiments, the distal portion 688 of the tube 680 includes first and second longitudinal slits 682 (only one visible in FIG. 7), each extending proximally from a distal end of the manipulation shaft 110. In any case, the slits 682 can divide the tube 680 into first and second flex regions 684 that are free to lift radially away from the cured material 640 when the distal end of the delivery shaft 108 is pulled to a position proximal of the flex regions 684 such that the flex regions 684 are exposed. The manipulation shaft 110 can be pulled proximally to facilitate release of the composite structure by the flex regions 684. Once the composite structure is released and delivery of the embolic composition 202 is complete, the injection shaft 112 can be withdrawn from the channel extending through the composite structure. The delivery system can then be withdrawn from the body, leaving the occlusive device 120 implanted in the aneurysm. Although two slits 682 and two flex regions 684 are shown in FIGS. 7 and 8, the tube 680 can have any number of slits 682 and flex regions 684 (e.g., three slits and three flex regions, four slits and four flex regions, etc.).

In some embodiments the tube 680 is a thermoplastic tube (or "shrink tube") or other thin-walled polymer tube. In those embodiments in which the tube 680 is a shrink tube, the slits 682 can be cut into the shrink tube after it has been shrunk. In other embodiments the tube 680 can have other configurations, such as a ribbon of material (not shown) that has a proximal end bonded to at a location along the distal portion 110b of the manipulation shaft 110. The remainder of the ribbon can be wound around the distal portion 110b and the shelf 145 (FIG. 6) of the cured material 640. The ribbon can be formed of a shrinkable or other material. In some embodiments, the mating surfaces of the cured material 640 and/or the flex regions 684 could be textured to increase the coefficient of friction to improve retention force yet still allow release upon withdrawal of the delivery shaft 108. Additionally, the mating surfaces of the cured material 640 and/or the flex regions 684 can be formed to include topographical features that interlock with topographical features on the mating surface of the other of the cured material 640 or flex regions 684, such as rings, teeth, and/or other texturing.

CONCLUSION

Although many of the embodiments are described above with respect to systems, devices, and methods for securing and delivering an occlusive device to a neurovascular aneurysm, the technology is applicable to other applications and/or other approaches, such as securement and delivery of other, non-braided and/or non-occlusive devices, treatment of vascular diseases other than aneurysms, and treatment of vascular disease in other parts of the vasculature. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 2A-8.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A treatment system comprising:
    a delivery shaft having a proximal portion, a distal portion, and a lumen extending therethrough, wherein the distal portion is configured to be intravascularly positioned proximate an aneurysm;
    a manipulation shaft slidably positioned within the lumen of the delivery shaft, the manipulation shaft having a proximal portion and a distal portion; and
    an occlusive device configured for implantation within the aneurysm, the occlusive device having a proximal end, a distal end, and a longitudinal axis, wherein the occlusive device comprises a plurality of filaments that are secured to one another at the proximal end of the occlusive device by a cured material, wherein the occlusive device comprises an inner layer of braided filaments and an outer layer of braided filaments, each having proximal end regions, and wherein the proximal end region of the inner layer has an exposed portion that extends proximally beyond the proximal end region of the outer layer, and wherein the cured material extends into and fills interstices between the braided filaments at the proximal end regions of the inner and outer layers, and
    wherein the occlusive device is disposed in a collapsed state within the lumen of the delivery shaft for delivery to the aneurysm and is coupled to the manipulation shaft such that the distal portion of the manipulation shaft is positioned over the exposed portion of the inner layer and proximal of the proximal end region of the outer layer.

2. The treatment system of claim 1, wherein the cured material has a first region with a first diameter and a second region with a second diameter greater than the first diameter, the second region being distal of the first region along the longitudinal axis of the occlusive device.

3. The treatment system of claim 2, wherein:
    the first region of the cured material surrounds and secures the portion of the proximal end region of the inner layer extending proximally beyond the outer layer, and
    the second region of the cured material surrounds and secures the proximal end regions of both the inner and outer layers.

4. The treatment system of claim 2, wherein the first region and the second region are annular.

5. The treatment system of claim 2, wherein the first region of the cured material defines a recess, and wherein the distal portion of the manipulation shaft comprises an interlocking element configured to be received within the recess of the cured material.

6. The treatment system of claim 5, wherein, when the occlusive device is disposed within the delivery shaft, an inner surface of the delivery shaft prevents the interlocking element of the manipulation shaft from lifting radially away from the recess in the occlusive device, thereby securing the occlusive device to the manipulation shaft.

7. The treatment system of claim 5, wherein, when the manipulation shaft is received by the recess, a combined thickness of the manipulation shaft and the first region is no greater than a thickness of the second region.

8. The treatment system of claim 5, wherein, when the occlusive device is pushed proximally out of the delivery shaft such that the cured material is distal of a distal end of the delivery shaft, the interlocking element is free to lift radially away from the recess, thereby detaching the occlusive device from the manipulation shaft.

9. The treatment system of claim 1, wherein the cured material defines a channel extending longitudinally therethrough, and wherein the treatment system further comprises an injection shaft positioned within at least a portion of the manipulation shaft and extends distally through the channel.

10. The treatment system of claim 9, wherein the injection shaft is configured to receive an embolic composition therethrough.

11. The treatment system of claim 9, wherein the injection shaft has a proximal portion having a first outer diameter and a first inner diameter, and a distal portion having a second outer diameter less than the first outer diameter and a second inner diameter less than the first inner diameter, and wherein the proximal portion of the injection shaft terminates distally prior to a proximal edge of the cured material and the distal portion of the injection shaft extends through the channel in the cured material.

12. The treatment system of claim 1, wherein the cured material does not comprise a metal band.

13. The treatment system of claim 1, wherein the cured material forms a first layer over the exposed portion of an outer surface of the inner layer and a second layer over a radially inner surface of the inner layer.

14. The treatment system of claim 1, wherein the manipulation shaft includes a plurality of interlocking elements and the first region of the cured material defines a plurality of recesses, each configured to receive an individual one of the interlocking elements.

15. A treatment system comprising:
- a delivery shaft having a proximal portion, a distal portion, and a lumen extending therethrough, wherein the distal portion is configured to be intravascularly positioned proximate an aneurysm;
- a manipulation shaft slidably positioned within the lumen of the delivery shaft, the manipulation shaft having a proximal portion, a distal portion, and an interlocking element at the distal portion; and
- an occlusive device configured for implantation within the aneurysm, the occlusive device having a proximal end, a distal end, and a longitudinal axis, wherein the occlusive device comprises a plurality of filaments that are secured to one another at the proximal end of the occlusive device by a cured material, the proximal end comprising a first annular region and a second annular region, wherein a thickness of the first annular region is less than a thickness of the second annular region such that the first annular region and the second annular region define a shelf that receives the interlocking element of the manipulation shaft therein, and wherein the plurality of filaments comprise an inner layer of braided filaments and an outer layer of braided filaments, each having proximal end regions, and wherein the proximal end region of the inner layer extends proximally beyond the proximal end region of the outer layer, wherein the interlocking element is configured to be movable in a radial direction into and out of the shelf, and wherein, when the occlusive device is disposed in the delivery shaft, an inner surface defining the lumen of the delivery shaft prevents the interlocking element of the manipulation shaft from lifting radially away from the shelf in the occlusive device, thereby securing the occlusive device to the manipulation shaft.

16. The treatment system of claim 15, wherein:
a first portion of the cured material surrounds and secures the portion of the proximal end region of the inner layer that extends proximally beyond the outer layer, and
a second portion of the cured material surrounds and secures the proximal end regions of both the inner and outer layers.

* * * * *